Feb. 13, 1934.   B. R. BENJAMIN   1,946,664
TRACTOR CULTIVATOR
Filed June 15, 1932   2 Sheets-Sheet 2

Inventor
Bert R. Benjamin
By N. P. Dodge Atty.

Patented Feb. 13, 1934

1,946,664

UNITED STATES PATENT OFFICE 1,946,664

TRACTOR CULTIVATOR

Bert R. Benjamin, Oak Park, Ill., assignor to International Harvester Company, a corporation of New Jersey Application June 15, 1932. Serial No. 617,303

4 Claims. (Cl. 97—47)

This invention relates to tractor cultivators and has for its principal object the provision of flexible mountings or connections between a tractor and an elongated, transversely disposed implement carrying beam, which are so constructed as to allow movements of the implement beam laterally in the direction of its longitudinal axis and also permit it to tilt in substantially the plane of that axis. A further object is to provide a tractor attachment for simultaneous cultivation of several rows of narrowly spaced row-crops, such as beets, etc. comprising a tool carrying member pivotally connected to the tractor through parallel drag-links which are movable laterally and vertically together with the tool carrying member, by control means on the tractor.

These objects are attained by the novel construction and arrangement of elements hereinafter described and claimed, and illustrated on the accompanying drawings, where:

Figure 3 is an enlarged detail view of the tool bar, as seen on the line 3—3 in Figure 1.

Figure 1:
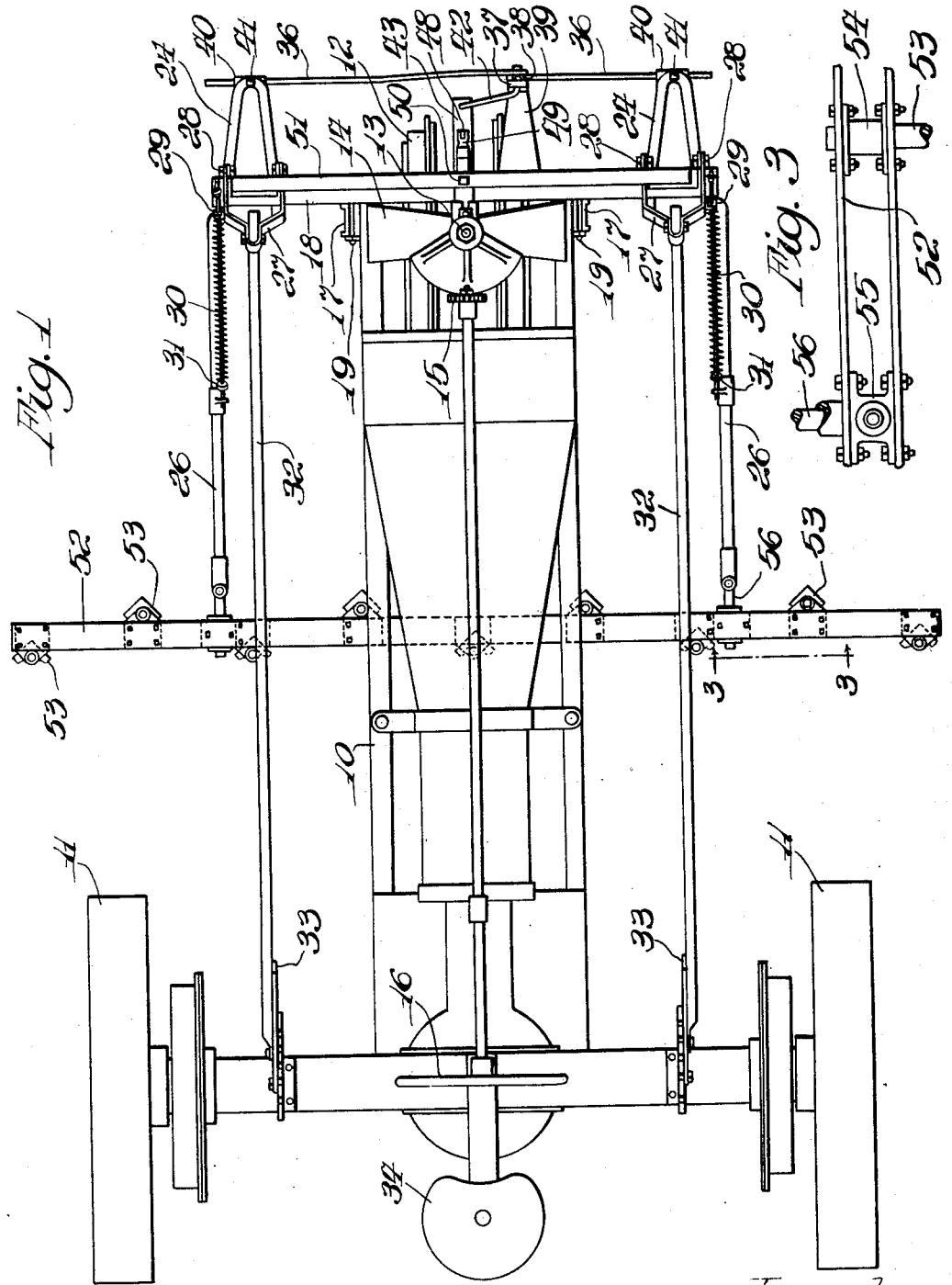
Figure 1 is a plan view of a tractor cultivator embodying the invention.

In the present instance, the invention is illustrated in combination with a row crop tractor of the well known type having a comparatively narrow main frame or body 10 supported on widely spaced rear traction wheels 11 adapted to straddle a plurality of plant rows and having dirigible supporting means at the front, such as a centrally positioned steering truck 12. The steering truck includes an upright standard 13 swiveled in a front cross member or head 14 on the tractor, which standard is steered through suitable gearing 15 at its upper end, which transmits movement of the steering rod and wheel 16.

On the forward corners of the tractor body, at each side of the crosshead, suitable brackets 17 are provided. These brackets are formed with longitudinally extending, bolt receiving sockets and serve to support an implement supporting member 18 extending across the front end of the tractor and projecting beyond each side thereof, as best seen in Figure 1. This supporting member may consist of an angle iron bar having a vertical web clamped to the brackets 17 by bolts 19, with its horizontal web extending forwardly. At each end thereof the implement supporting member 18 has secured thereto a depending pivot bracket 20. This bracket is preferably bolted to the under side of the horizontal web of the member 18. It is preferably formed as a yoke-shaped casting open rearwardly, and the arms of the bracket 20 are provided with openings for a pivot member or pin 21 on which there is rotatably mounted a coupling member 22. The coupling member 22 is formed with a tool carrying portion or body 23 projecting rearwardly and with a forwardly projecting, rigid extension or arm 24 illustrated as a single bar bent into V-shape with its arms straddling the bracket member 20 and bolted at 25 to the body of the coupling member 22. The rear portion 23 of the coupling member is formed with a transverse, horizontal pivot opening which receives the angularly extended end of a trailing dragbar 26. This connection permits each dragbar to swing vertically, but holds it rigid as to lateral movement with relation to the coupling member 22.

Above each coupling member there is mounted on the supporting member 18 a rock-arm 27, which may be of the yoke shape illustrated, with the arms thereof pivoted at 28 to suitable lugs on the upper surface of the horizontal web of the supporting member 18. Intermediate the ends, the arms of the yoke-shaped member 27 are provided with laterally extending ears 29 provided with openings to slidably receive lifting links 30 connected at their lower ends to the respective dragbars 26. Each lifting link is surrounded by the usual pressure spring which is confined between a collar 31 on the link and the ear 29 on the rock-arm 27. The upper end of each rock-arm 27 is pivoted to a rearwardly extending actuating shaft 32 connected at its rear end to a hand lever 33 mounted on the rear of the tractor in convenient position to the driver's station or seat 34. With this construction, forward rocking movement of the respective hand levers 33 will correspondingly rock the arm 27, causing the ears 29 to engage stops 35 on the lifting links 30 during lifting movement, thereby raising the dragbars, or, upon reverse or lowering movement, causing the lugs 29 to compress the springs on the lifting links to yieldably force the dragbars 26 downwardly.

Figure 2:
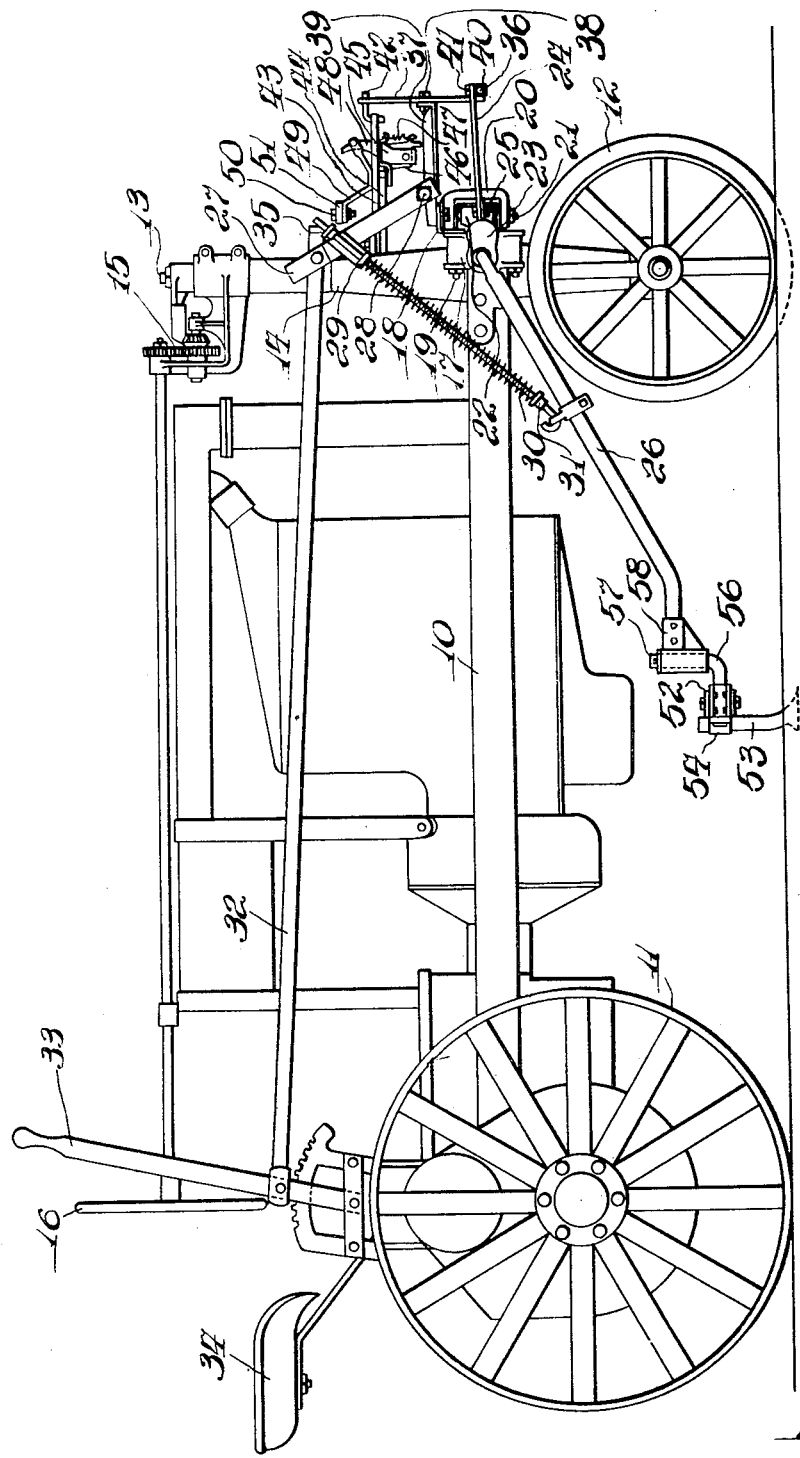
Figure 2 is a side view of the same.

In order to effect quick lateral movements of the dragbars 26 and the implements connected thereto, the forwardly extending arms 24 of the respective coupling members 22 are connected by links 36 with the lower end of a lever 37 intermediately pivoted at 38 to a suitable support or bracket 39 extending forwardly from the member 18. The outer ends of the links 36 are secured in collars 40 mounted on depending pivot bolts 41 on the arms 24. The lever 37 is preferably actuated by means of a connecting link 42 pivotally connected to the forward end of a forwardly extending arm 43, rotatably mounted on the standard 13 of the steering truck immediately above a similar, but shorter arm 44 (Figure 2), which is fixed to the standard 13 to move therewith. The rotatable arm 43 is formed with a depending bracket 45 on which there is pivoted a latch member 46 having a portion adapted to engage a notch provided in the forward end of the fixed arm 44 and normally held in said notch by a spring 47 connected at one end to a downward extension on the latch member and suitably anchored at the other end on the loose arm 43. The latch member 46 is formed with an upwardly extending tail piece 48 passing through an opening or slot in the loose arm 43 at a point just above the end of the fixed arm 44. The tail piece 48 of the latch member is pivotally connected to a support or slide 49, which is curved rearwardly and upwardly, as illustrated, and rides on the upper surface of the loose arm 43. The rear end of the support 49 is secured at 50 to the center of a transversely extending latch control bar 51, best seen in Figure 1, the ends of which are located just forwardly of the rock-arms 27. Therefore, when one or both of these arms are rocked forwardly to lift the dragbars 26, the control bar 51 will be engaged and moved forwardly, thereby swinging the latch member 46 forwardly and releasing it from the notch in the fixed arm 44. When this occurs, the arm 44 and the standard 13 of the steering truck, to which it is fixed, become free to move independently of the loose arm 43, and no motion is transmitted to the coupling members 22 under those conditions. When, however, the latch 46 is engaged in the forward notch of the fixed arm 44, which is the case when the dragbars 26 are lowered, the arms 43 and 44 will swing in unison as steering movement is imparted to the dirigible truck, and this movement will be transmitted through lever 37 and links 36 to the coupling members 22, so that these and the dragbars 26 will swing laterally in unison. The construction so far described is not specifically a part of the present invention and is claimed in a co-pending application, Serial No. 609,624 filed May 6, 1932.

In the practice of the present invention, there is provided a transversely extended implement supporting beam 52 extending across the path of the tractor and beyond each side thereof in the manner illustrated in Figure 1. This beam is equipped with suitably spaced cultivating tools or shovels 53 arranged to cultivate opposite sides of narrowly spaced plant rows. The beam 52 is preferably composed of vertically spaced, flat bars seen in Figure 3 separated by spacing blocks 54 which may be formed with vertical sockets for the standards of the tools 53. At its opposite end portions, the implement beam 52 is provided with a spacing block 55 corresponding to the blocks 54 but formed with a fore and aft bearing opening. These openings have journaled therein the horizontal, rearwardly extending arm of angular pivot members 56 which have the vertical arm 57 journaled in a socket piece 58 secured to the rear or lower end of each dragbar 26. The pivotal connection of the members 56 to the dragbars and to the implement beam is, therefore, such as to permit movement of the implement beam both laterally and vertically, and, as the dragbars 26 are substantially parallel, the lateral movement of the implement supporting beam will be substantially rectilinear.

With the implement beam and dragbar construction described, steering movements transmitted to the dragbars will cause corresponding shifting movement of the implement beam 52 and either end of the implement beam may be adjusted separately as to height. Also, the pivotal connections are such that the implement beam may float and tilt in the vertical plane of its longitudinal axis to accommodate itself to variations in the ground surface.

There has accordingly been provided a simple, flexible, and easily controlled implement carrying attachment, particularly adapted for cultivation of certain row grown crops, and, while the preferred embodiment has been illustrated, it will be understood that it is capable of variations without departure from the scope of the invention as defined in the following claims.

What is claimed is:

1. The combination of a tractor, a cross-member on the forward end of the tractor extending beyond each side thereof, a dragbar trailing from each end of the cross-member and pivoted thereto for lateral swinging movement, means on the tractor for swinging the dragbars, means on the tractor for lifting and lowering each dragbar, an implement carrying beam extending transversely across the path of the tractor and beyond each side thereof, and an angular pivot member on each end portion of the implement beam having a horizontal arm journaled on the beam and a vertical arm journaled on the end of the dragbar.

2. The combination of a tractor, a cross-member on the forward end of the tractor extending beyond each side therof, a dragbar trailing from each end of the cross-member and pivoted thereto for lateral swinging movement, means on the tractor for swinging the dragbars, means on the tractor for lifting and lowering each dragbar, an implement carrying beam extending transversely across the path of the tractor and beyond each side thereof, and means pivotally connecting the opposite end portions of the implement beam to the dragbars for movement about horizontal and vertical axes.

3. The combination of a tractor, a cross-member on the forward end of the tractor extending beyond each side thereof, a dragbar trailing from each end of the cross-member and pivoted thereon for lateral swinging movement, means on the tractor for swinging the dragbars, an implement carrying beam extending transversely across the path of the tractor and beyond each side thereof, and pivot members on the end portions of the implement beam having vertical portions pivoted to the ends of the dragbars.

4. The combination of a tractor, a cross-member on the forward end of the tractor extending beyond each side thereof, a dragbar trailing from each end of the cross-member and pivoted thereon for movement vertically, means on the tractor for adjusting each dragbar about its pivot on the cross-member, a horizontal pivot arm forming a rearward extension of each dragbar, an implement carrying beam extending between the ends of the dragbars, bearing members on the ends of the implement beam in which the horizontal pivot arms of the dragbars are pivoted, and a second pivotal connection between each dragbar and the beam disposed in angular relation to said pivot arms.

BERT R. BENJAMIN.